US007819063B1

(12) United States Patent
Lehman

(10) Patent No.: US 7,819,063 B1
(45) Date of Patent: Oct. 26, 2010

(54) INFLATABLE EXPLOSIVE BREACHING DEVICE

(75) Inventor: Matthew D. Lehman, 13874 Maple Ridge Rd., Milford Center, OH (US) 43045

(73) Assignee: Matthew D. Lehman, Milford Center, OH (US)

( * ) Notice: Subject to any disclaimer, the term of this patent is extended or adjusted under 35 U.S.C. 154(b) by 617 days.

(21) Appl. No.: 11/820,541

(22) Filed: Jun. 21, 2007

(51) Int. Cl.
*F42B 3/00* (2006.01)
*B23D 31/00* (2006.01)
*B26F 3/00* (2006.01)

(52) U.S. Cl. ....................... 102/301; 102/321; 102/323; 102/324

(58) Field of Classification Search ................. 102/301, 102/315, 321, 323, 324
See application file for complete search history.

(56) References Cited

U.S. PATENT DOCUMENTS 1,638,038 A * 8/1927 Jenkins ....................... 102/331
2,911,910 A * 11/1959 Welsh, Jr. ................... 102/321
3,783,787 A * 1/1974 Thornley et al. ............ 102/331
3,791,297 A * 2/1974 McKee ....................... 102/317
4,151,798 A 5/1979 Ridgeway
4,422,382 A * 12/1983 Marz .......................... 102/331
4,499,828 A * 2/1985 Honodel ..................... 102/301
4,787,316 A * 11/1988 Drury et al. ................. 102/323
4,813,358 A * 3/1989 Roberts ...................... 102/313
4,872,408 A * 10/1989 Marz .......................... 102/324
4,873,928 A * 10/1989 Lowther ..................... 102/323
5,259,316 A * 11/1993 Nelson et al. ............... 102/312
H1457 H * 7/1995 Sullivan, Jr. ................ 102/324
5,719,350 A * 2/1998 Parkes et al. ................ 102/303
5,777,257 A 7/1998 Kenny
5,864,767 A * 1/1999 Drumgoole et al. ......... 588/313
6,101,948 A * 8/2000 Knaresboro et al. ......... 102/291
6,324,982 B1 * 12/2001 Eybert-Berard et al. ..... 102/363

* cited by examiner

*Primary Examiner*—Bret Hayes
(74) *Attorney, Agent, or Firm*—Harpman & Harpman; Rich Harpman

(57) ABSTRACT

A breaching device for positioning explosives on a structure for rapid entry constructed of soft, plastic material formed into elongated inflatable chambers allowing the breaching device to be positioned by secondary attachment means to a target surface. A sleeve is formed on the chamber for insertion of an explosive material thereby reducing the need for supplemental construction materials for the device. The rigidity of the inflated device is achieved by inflation so as to hold its shape and be semi self-supporting and to increase the ease to which the device can be deployed. By utilizing a device which will hold its specific shape and precise positioning of explosives therewithin will insure that the explosive force of detonation will be applied directly to the structure and the desired shape, size and amount for breaching a structure for entry.

5 Claims, 4 Drawing Sheets

INFLATABLE EXPLOSIVE BREACHING DEVICE

TECHNICAL FIELD

This invention relates to breaching devices to position explosives and surface structures so as to allow for precise detonation and control of the charge for access to the structure.

BACKGROUND OF THE INVENTION

Special weapons and tactical teams including police and military personnel have the need for easily constructed explosive breaching devices to be used to gain access into locked or barricaded buildings where dramatic entry is needed for the purpose of securing criminals, terrorists, hostages or other illegal activity locations. Other uses of such devices would be for the rescue of individuals trapped in collapsed buildings and the like. Multiple configurations of the present invention are provided to be appropriate for different breaching techniques required in which trained personnel can make entry into the target or the breaching device is employed. By utilizing precise calculated deployment of explosive materials to gain entry with minimum force and the reduction of collateral damage to surrounding structure is an important aspect of the invention in its deployment components.

DESCRIPTION OF PRIOR ART

Prior art devices of this type have been used to provide positioning explosive charges, see for example U.S. Pat. Nos. 4,151,798 and 5,777,257.

In U.S. Pat. No. 4,151,798 a shaped explosive charge device for underwater use is disclosed in which a shaped charge is defined and positioned for underwater use wherein a deflated inflatable element is positioned within a standoff space and when the device is positioned for firing, the inflatable element is inflated to exclude water from the cavity and standoff space between the explosive and its target surface.

In U.S. Pat. No. 5,777,257 a shaped charge assembly with truncated liner is disclosed in which a tubular member is provided for particular use underwater in which the assembly is lowered into the tubular member. A shaped charge carrier having a pair of parallel circular plates, a casing unitary connecting the plates and a truncated shaped charge liner with an inflatable bladder surrounding the case and expands to create a standoff distance between the wall of the tubular member and the shell of the assembly.

SUMMARY OF THE INVENTION

The present invention provides an easily transportable and deployable breaching device that is constructed so as to be reliable, fast and accurate in a variety of use applications. The breaching device of the invention utilizes flexible detonating cord or other type of explosive which is placed in a sleeve of flexible material, secured to an inflatable shape which will press against the sleeve holding the explosive material in place and make the breaching device rigid so enough for unsupported application in a situation where there is no exterior supporting surface such as water tamping is used i.e. adhesive, prop, stick, string. The amount of explosive material placed in the sleeve is dependent on the trained persons desired explosive force when using the present invention. For structures that are reinforced that required shaped charge sheet explosives and the present invention may be used with plastic shaped charge inserts additionally.

DETAILED DESCRIPTION OF THE INVENTION

Figure 1:
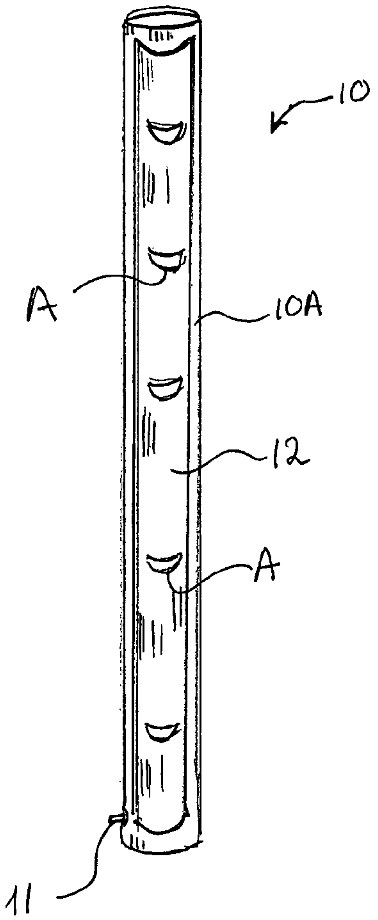
FIG. 1 is a perspective view of the primary form of the invention.
Figure 2:
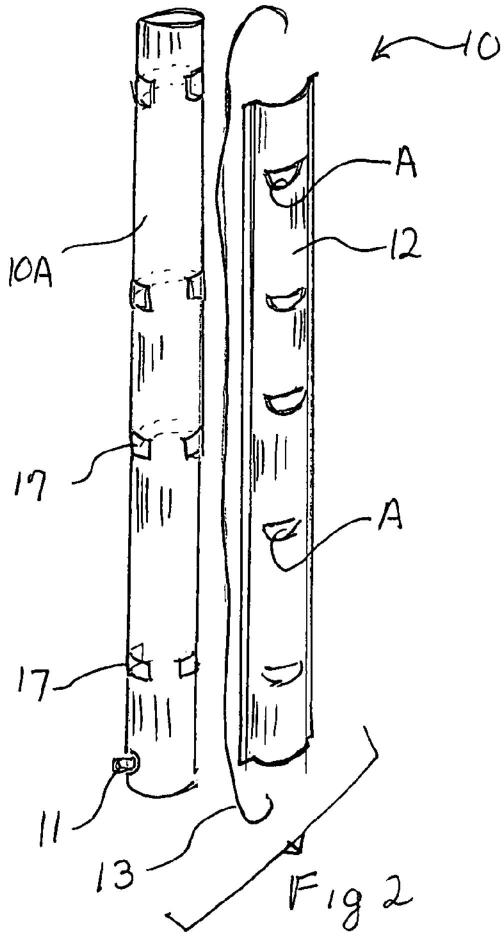
FIG. 2 is an exploded perspective view of the primary form of the invention.
Figure 3:
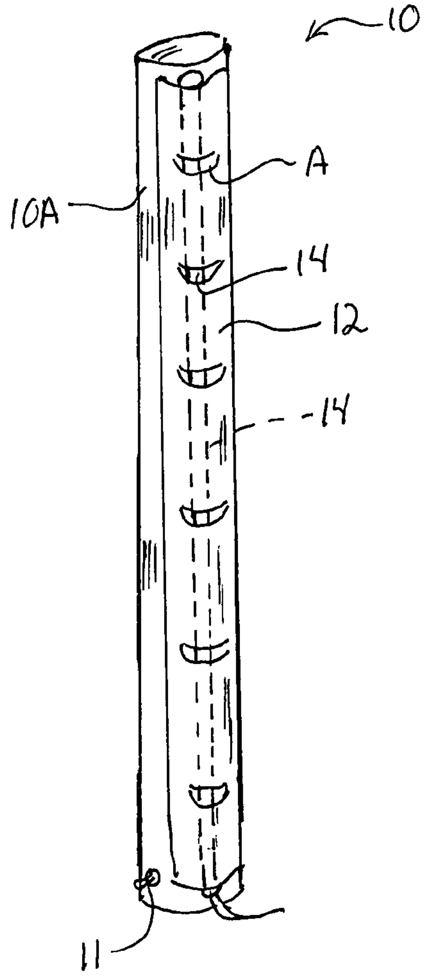
FIG. 3 is a perspective view of the invention showing an explosive charge positioned therewithin.

Referring to FIGS. 1 and 2 of the drawings, a breaching device 10 of the invention can be seen having a tubular sealed construction 10A of inflatable flexible synthetic resin material via a one-way valve 11 which upon inflation will make the device rigid. An explosive material retainment sleeve element 12 is secured on the surface of the tubular member running parallel therewith along the longitudinal axis of the device. An installation cord 13 is utilized in the sleeve so as to provide a mechanism for easy installation of explosives 14, best seen in FIG. 3 of the drawings.

A plurality of longitudinally spaced apertures A are positioned in the sleeve so as to provide visual reference and confirmation of the positioning of the explosive 14 therewithin.

The tubular housing 10A can use a variety of attachment mechanisms to secure same to a structure (not shown) such as adhesive or magnets or even multiple hook and loop fasteners as generally illustrated at 17.

Figure 4:
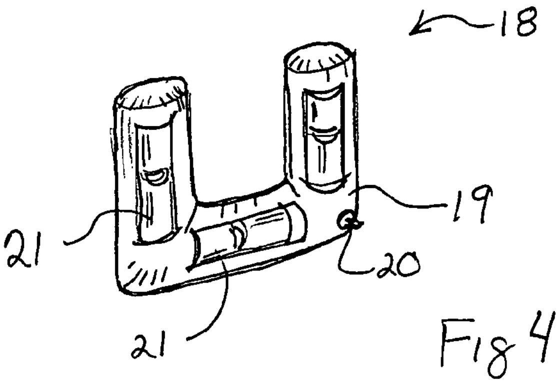
FIG. 4 is a perspective view of an alternate form of the invention.

Referring now to FIG. 4 of the drawings, an alternate form of the invention can be seen at 18 in which a C-shaped body member 19 is formed of a sealed tubular configuration with an inlet valve 20 and a plurality of charge retention sleeves 21 formed thereon. A variety of attachment mechanisms can also be used in the alternate form as previously noted included double adhesive tape, Velcro fasteners or other fastening elements, common and expected and well known within those familiar with the art.

Figure 5:
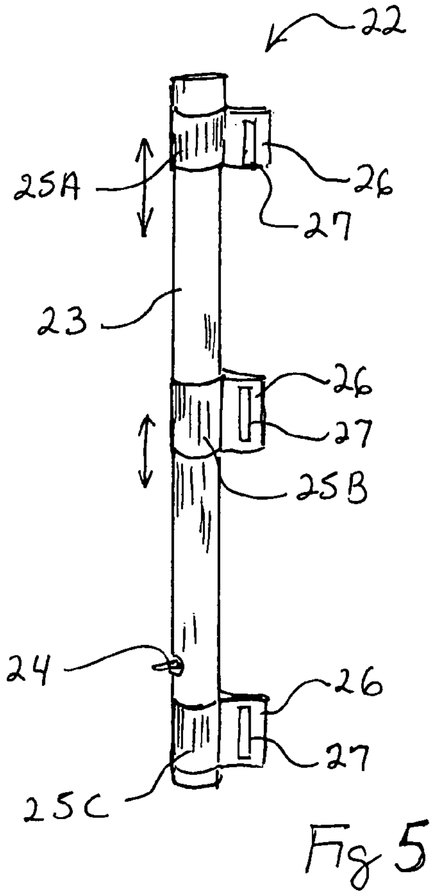
FIG. 5 is a perspective view of a second alternate form of the invention defined as a linear hinge slide breaching device.

Referring to FIG. 5 of the drawings, a second alternate form of the invention can be seen at 22 in which a tubular support housing 23 is formed having an air inlet valve at 24 with a plurality of slidably disposed sleeves 25A, 25B and 25C selectively positioned thereon. Each of the sleeves 25 has an attachment surface tab 26 extending outwardly therefrom on which attachment means such as adhesive, string, adhesive magnets or hook and loop fastener material indicated generally at 27 can be positioned as will be well understood and known to those skilled in the art.

It will be evident that the sleeves 25 can be selectively positioned longitudinally on the housing 23 so as to provide a variety of mounting application configurations to match use venue requirements.

Figure 6:
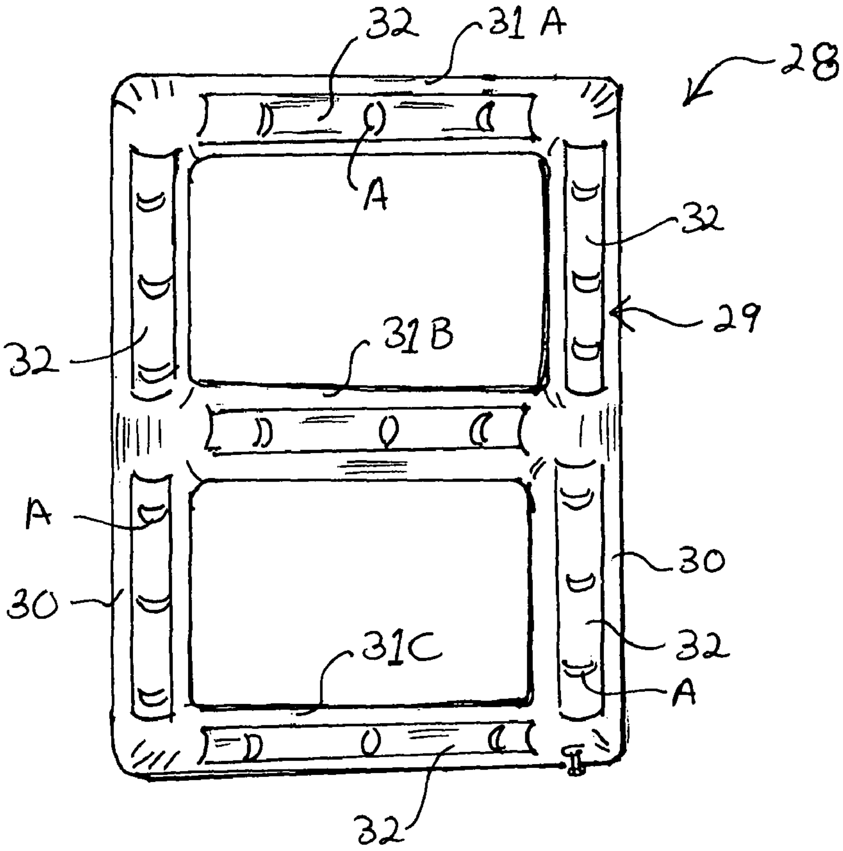
FIG. 6 is a front elevational view of an alternate form of the invention for wall and window breaching.

Referring now to FIG. 6 of the drawings, a fourth alternate form of the invention is shown at 28 in which an inflatable housing 29 defines two rectangular openings via a pair of spaced parallel vertical rails 30 interconnected by three horizontally extending cross members 31A, 31B and 31C. As set forth previously, the housing 29 has a plurality of explosive retainment sleeves 32 formed respectively about their out facing surface in oppositely disposed pair orientation to one another. Each of the sleeves 32 has a plurality of openings A therein for visual inspection of a positioned explosive shaped charge lightably disposed as previously indicated.

Figure 7:
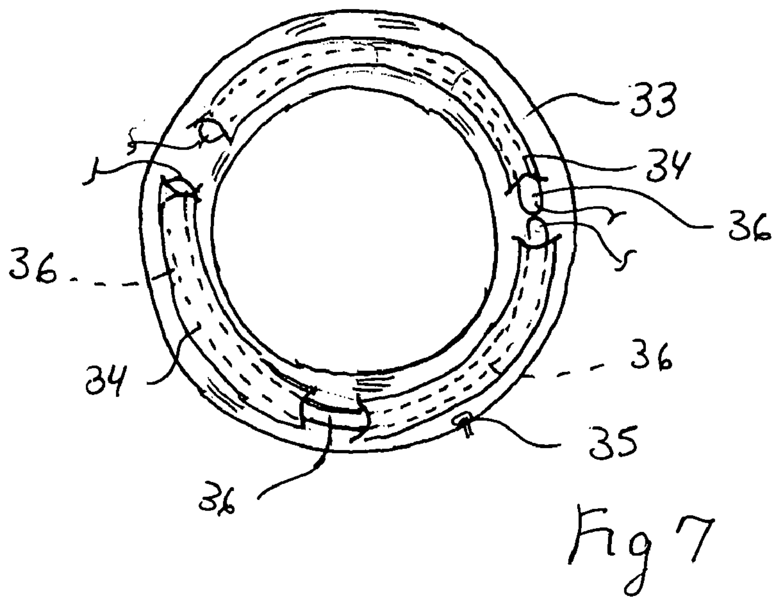
FIG. 7 is a front elevational view of a circular round shape breaching device.

Referring now to FIG. 7 of the drawings, an alternate form of the invention can be seen in which a housing 33 is in a circular configuration having correspondingly a circular sleeve explosive retainment sleeve 34 positioned thereon having a plurality of apertures A therein spaced radially thereabout.

It will be evident from the above description that this alternate form of the invention also has an inlet inflation valve 35 and is provided with a variety of attachment means to a surface on which to be placed as previously described. The device also has a positioning string which is used for prepositioning an explosive charge 36 positioned within the sleeve which is visible for placement and confirmation via the apertured openings therein.

Figure 8:
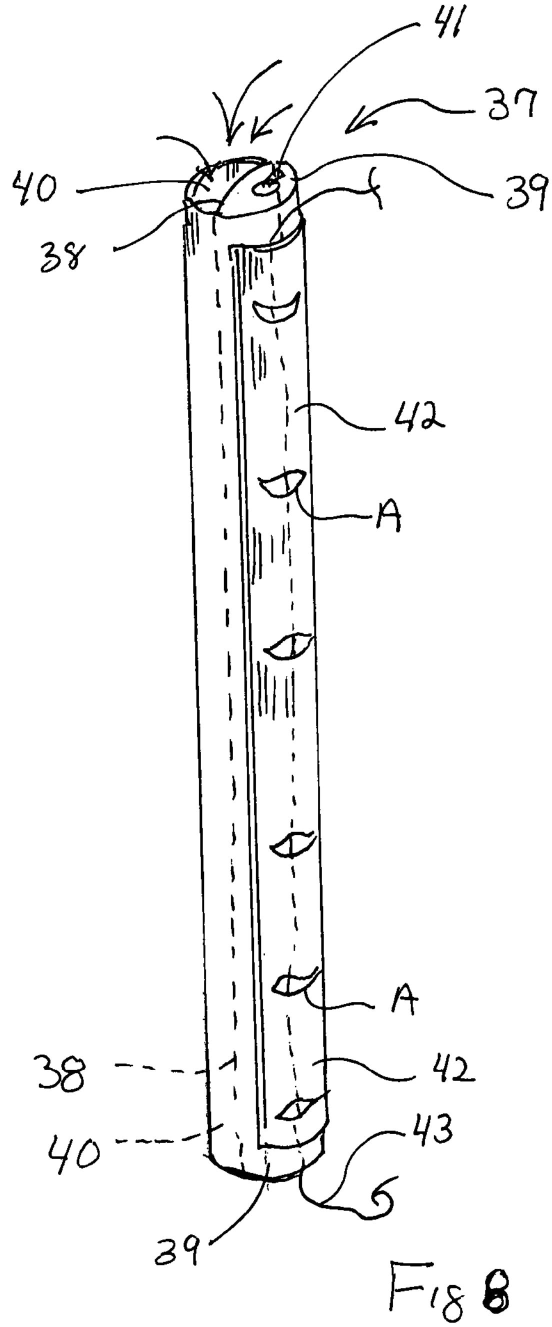
FIG. 8 is a perspective view of a water tamp linear breaching device.

Referring now to FIG. 8 of the drawings, yet another alternate form of the invention 37 is shown which is a water tamped linear configuration. The embodiment remains the same as previously disclosed and described devices with the addition of a central baffle 38 in the housing for separation of an air chamber 39 and a tamping material chamber 40 which, as noted, can be water or other insertable material such as sand.

The inflatable breaching device has a one-way valve 41 into the air chamber and an elongated sleeve 42 positioned on the outer surface of the housing for holding an elongated explosive charge therewithin. Access openings A are formed within the sleeves spaced linearly so as to visually confirm and help position the charge as previously described. A string 43 is also provided for positioning and manipulation of the explosive material within the sleeve 42 against the housing body member, as noted.

Fastening elements again are selectively provided being of adhesive or magnetic or fabric fastener configurations (not shown) F representative of a variety of mounting configurations well known to those skilled in the art.

Figure 9:
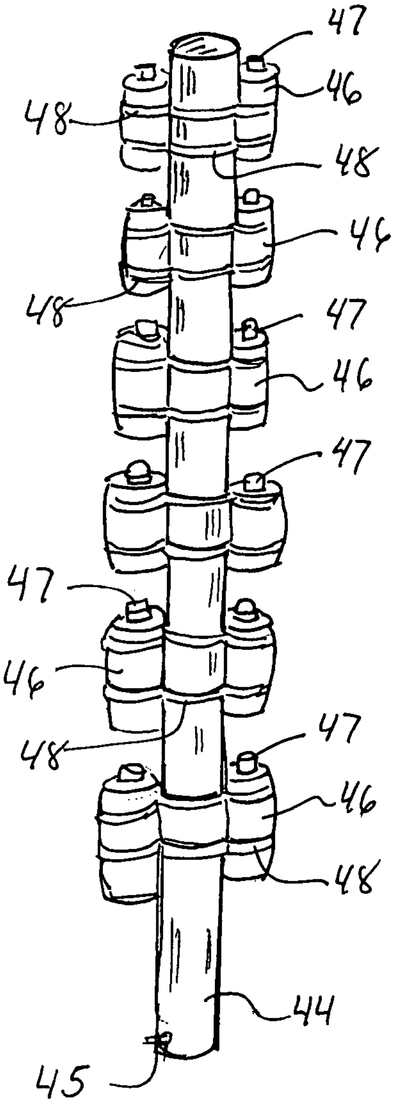
FIG. 9 is a perspective view of an alternate form of the invention showing modular linear sextuple dual water tamp configuration of the invention.

Referring now to FIG. 9 of the drawings, another version of the breaching apparatus in accordance with the embodiment of the present invention is shown. The device illustrates an elongated housing 44 having an inflation valve 45 for inflation thereof. An explosive material element may be disposed in the soft plastic housing 44 indented on the side of the present invention running parallel with the longitudinal axis thereof. Auxiliary tamps 46 can be attached to the sides of the present invention which are filled with tamping material such as water or sand through removable plastic caps 47 on the respective auxiliary tamps. The auxiliary tamps 46 are held secured to the present invention housing by a plurality of soft plastic strips 45 secured at one end of the tamp with the opposing end attached with hook and loop material. The housing may have attachment means, as previously noted including double sided adhesive, string, adhesive magnets or multiple hook and fasteners or hook and loop fastener fabric material, again well within the parameters of knowledge of those skilled within the art.

It will thus be seen that a new and novel multi-purpose inflatable explosive breaching device has been illustrated and described and it will be apparent to those skilled in the art that various changes and modifications may be made therein without departing from the spirit of the invention.

Therefore I claim:

1. A breaching device for positioning explosive charges for access oriented demolition comprises, an inflatable support column, an explosive charge receiving sleeve formed thereon, means for inflating said column, means for visually confirming explosive charges within said sleeve, means for selectively securing said column to a targeted support surface and means for positioning said explosive charges within said sleeve.

2. The breaching device set forth in claim 1 wherein said means for inflating said column comprises, a fluid inlet valve in communication with said column enclosure.

3. The breaching device set forth in claim 1 wherein said means for visually confirming explosive charges within said sleeve comprises, a plurality of longitudinally spaced aligned openings in said sleeve.

4. The breaching device set forth in claim 1 wherein said means for selectively securing said support column enclosures to a supporting surface comprises, fixation fasteners on said column of mechanical and adhesive attachment.

5. The breaching device set forth in claim 1 wherein said column enclosure is preferably made of synthetic flexible resin material.

* * * * *